United States Patent [19]

Iftikar et al.

[11] Patent Number: 5,175,657
[45] Date of Patent: * Dec. 29, 1992

[54] DISC DRIVE WITH MAGNETIC COUPLING TO A HEAD ACTUATOR IN A REMOVABLE DISC CARTRIDGE AND WITH SPINDLE MOTOR ROTOR CONFIGURED INTO THE REMOVABLE DISC CARTRIDGE

[75] Inventors: Syed Iftikar, Fremont; Albert J. Guerini, Gilroy, both of Calif.

[73] Assignee: Syquest Technology, Inc., Fremont, Calif.

[*] Notice: The portion of the term of this patent subsequent to Oct. 23, 2007 has been disclaimed.

[21] Appl. No.: 643,144

[22] Filed: Jan. 18, 1991

Related U.S. Application Data

[63] Continuation of Ser. No. 417,748, Oct. 5, 1989, abandoned, which is a continuation-in-part of Ser. No. 270,948, Nov. 14, 1988, Pat. No. 4,974,103, and Ser. No. 270,005, Nov. 14, 1988, Pat. No. 4,965,691.

[51] Int. Cl.⁵ .................. G11B 5/012; G11B 17/08; G11B 5/55
[52] U.S. Cl. ................. 360/98.01; 360/106; 360/97.01; 360/133; 360/98.07
[58] Field of Search .......... 360/133, 97.01, 97.02, 360/99.04, 99.08, 105, 106, 98.01, 98.07; 206/444, 312, 313; 369/291

[56] References Cited

U.S. PATENT DOCUMENTS

| 4,359,762 | 11/1982 | Stollorz | 360/133 X |
| 4,535,434 | 8/1985 | Kishi | 360/133 X |
| 4,571,718 | 2/1986 | Cahill et al. | 360/133 X |
| 4,965,691 | 10/1990 | Iftikar et al. | 360/133 |
| 4,974,103 | 11/1990 | Iftikar et al. | 360/99.08 X |

*Primary Examiner*—Andrew L. Sniezek
*Attorney, Agent, or Firm*—Fliesler, Dubb, Meyer & Lovejoy

[57] ABSTRACT

A disc drive (420) includes a spindle motor (432) having a stator assembly (436) which is provided in a radial gap configuration. A removable cartridge (422) includes a rotor assembly (472) mounted on a bearing arrangement (468) which additionally mounts the disc (430) contained in the cartridge (422). When the cartridge (422) is placed in the drive (420), the rotor assembly (472) of the cartridge (422) comes into alignment with the stator assembly (436) of the drive (420) so that the spindle motor (432) can cause the disc (430) contained in the cartridge (422) to rotate at the proper speed.

11 Claims, 13 Drawing Sheets

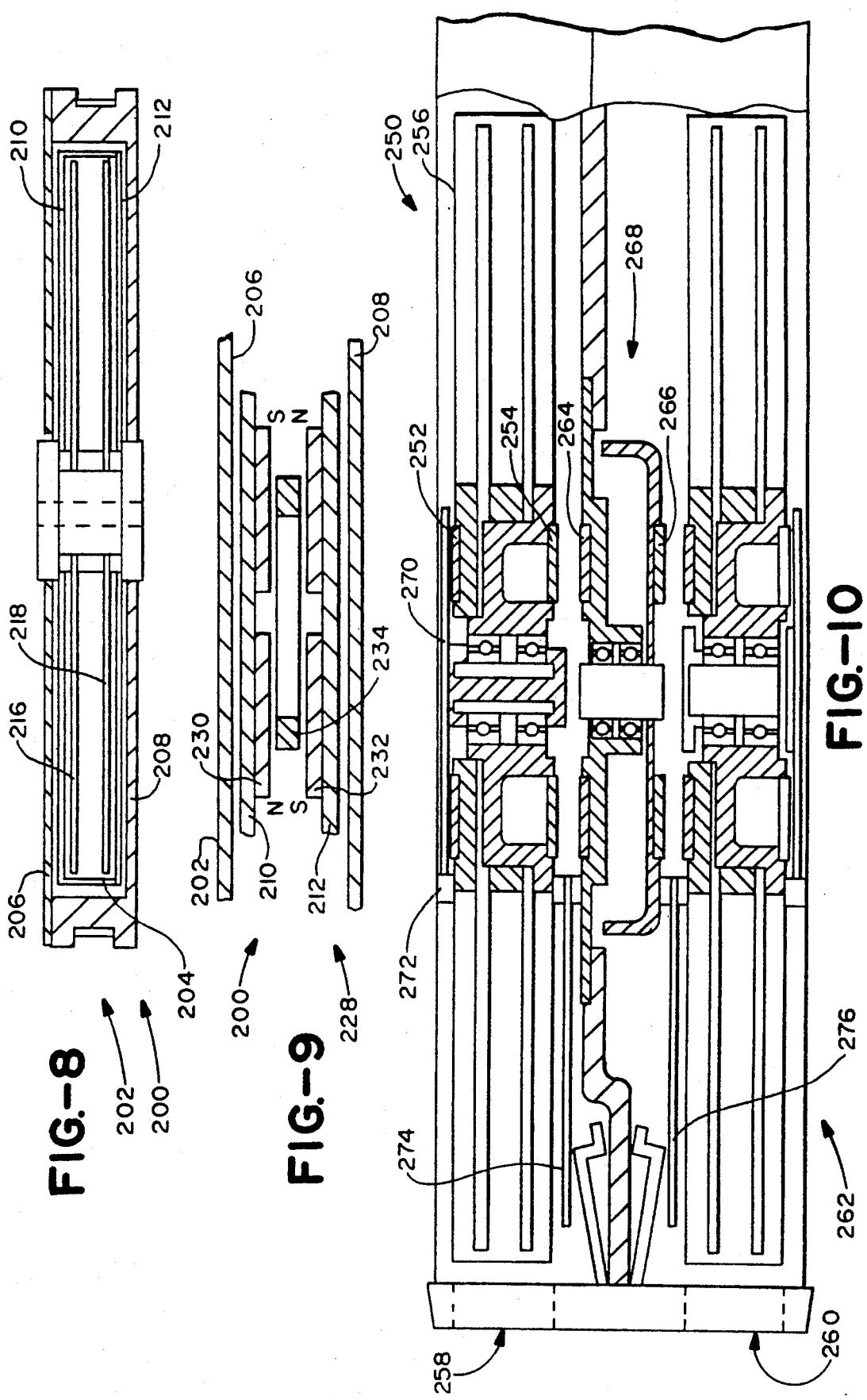

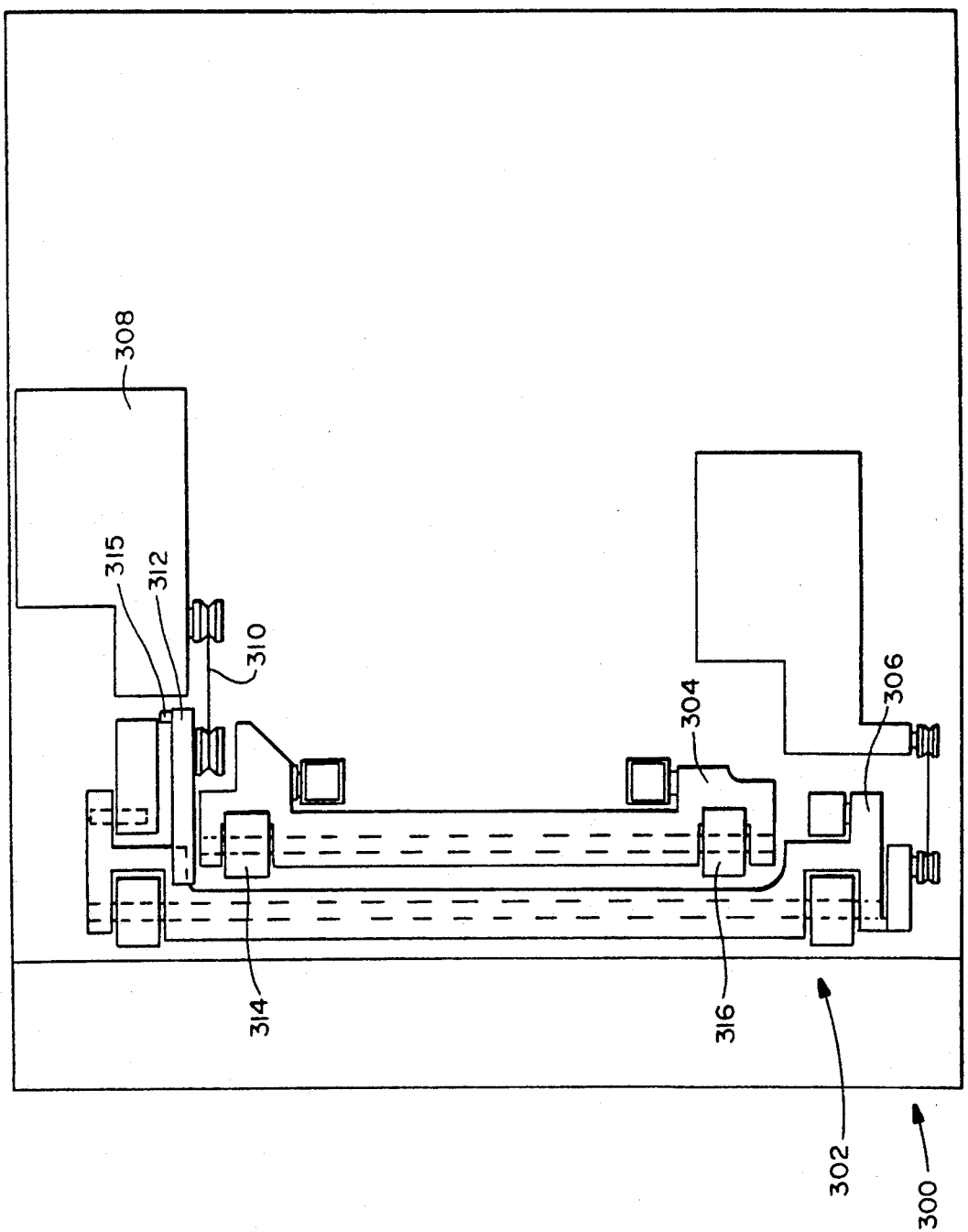

DISC DRIVE WITH MAGNETIC COUPLING TO A HEAD ACTUATOR IN A REMOVABLE DISC CARTRIDGE AND WITH SPINDLE MOTOR ROTOR CONFIGURED INTO THE REMOVABLE DISC CARTRIDGE

CROSS-REFERENCE TO RELATED APPLICATIONS

This application is a continuation of Ser. No. 07/417,748, filed Oct. 5, 1989, now abandoned, which is a continuation-in-part of U.S. Patent Application entitled "HIGH DENSITY DISC DRIVE WITH MAGNETIC CLUTCH FOR USE WITH A SEALED REMOVABLE CARTRIDGE", filed on Nov. 14, 1988, Ser. No. 07/270,948, now U.S. Pat. No. 4,974,103, issued Nov. 27, 1990, and of U.S. patent application entitled "SEALED REMOVABLE CARTRIDGE FOR USE WITH A HIGH DENSITY DISC DRIVE WITH A MAGNETIC CLUTCH", filed on Nov. 14, 1988, Ser. No. 07/270,005, now U.S. Pat. No. 4,965,691, issued Oct. 23, 1990; such applications were owned at the time of invention and are currently owned by the same assignee as the present application.

FIELD OF THE INVENTION

The present invention is related to a disc drive which can accept a cartridge containing an information storage disc.

BACKGROUND ART OF THE INVENTION

Syquest Technology, the present assignee has a number of patents issued which deal with removable media disc drives. These patents include by way of example, U.S. Pat. No. 4,504,879, issued Mar. 12, 1985 entitled "DISC CARTRIDGE ARRANGEMENT WITH DOOR ACTUATED MAGNETIC HEAD MOVEMENT LINKAGE" and U.S. Pat. No. 4,683,506, issued Jul. 28, 1987 entitled "DISC DRIVE ARRANGEMENT FOR A HARD DISC CARTRIDGE WITH A READ/WRITE HEAD RETRACT MECHANISM". With these drives, the drive itself includes a spindle motor for causing the disc located in a removable cartridge to spin. The disc is mounted in the removable cartridge with a hub assembly which includes a seating mechanism for causing the hub to engage onto the spindle of the spindle motor once the cartridge is inserted into the drive.

The spindle motor is in such arrangements are generally of the radial gap variety. A discussion of radial gap motors can be obtained in U.S. Pat. No. 4,745,345. Other types of disc drives, such as floppy disc drives use an axial gap motor positioned in the drive. A discussion of axial drive motors can also be obtained from the above U.S. Pat. No. 4,745,345. Additionally, VCR use such axial gap motors for the spindle motor.

With respect to the removable media disc drive, care must be taken in the design of the spindle motor, the hub arrangement, and seating arrangement which allows the removable media to be seated on the spindle of the spindle motor in order to minimize the effect of wobble or runout. Wobble or runout occur due to the fact that the centerline of the disc is not aligned with the centerline of the spindle motor. Further, additional concerns arise with the repeatability of positioning the disc and hub arrangement in the same manner on the same or different spindle of the same or different disc drive.

Further with such arrangements, as the hub and seating arrangements must extend through the cartridge housing, there is always the possibility that dust can be drawn in at the center of the cartridge when the disc is spinning.

Further with such arrangements, the cartridge receiving mechanism, which receives and positions the cartridge onto the spindle of the spindle motor in the disc drive must by nature be complex as it is required in some manner to accept the cartridge and then position the cartridge over the spindle motor without contacting the upstanding spindle. Then the receiving mechanism must set the cartridge down onto the spindle of the spindle motor. For removing the cartridge, the reverse process must be accomplished.

SUMMARY OF THE INVENTION

The present invention is directed to overcoming the disadvantages of the prior art.

The present invention includes a disc drive which can receive a removable cartridge containing a disc mounted on a bearing arrangement. With such an arrangement the center of rotation of the disc with respect to the bearing arrangement is always the same, thereby eliminating the runout or wobble concerns.

Further, the bearing arrangement includes a rotor assembly. The rotor assembly is comprised of a multiplicity of permanent magnets. The disc drive itself includes a housing including a receiving mechanism for receiving the cartridge. The spindle motor of the disc drive is mounted in the housing and includes a stator assembly which can operably engage the rotor assembly of the cartridge and can cause the disc inside the cartridge to spin. The spindle motor is mounted in such a manner such that with the cartridge received in the receiver mechanism, the stator assembly is spaced from the rotor assembly.

The stator assembly includes a plurality of coils which can be appropriately energized to urge the rotor assembly to spin the disc. Further, the stator assembly of the spindle motor has an axial gap type configuration.

In the embodiment described above, the rotor assembly is completely encased by the cartridge housing so that there is no opening for dust to be urged into the cartridge as the bearing assembly is spun at a higher velocity.

The present arrangement, as can be appreciated, provides for a stiff engagement between the rotor assembly and the stator assembly as together they form a spindle motor with the known characteristics of the responsiveness of the rotor assembly to energization of the stator assembly. Further with such an arrangement, the center of rotation of the rotor assembly with respect to the disc is always the same even if the center of rotation of the rotor is displaced from the center of rotation of the stator. The stiff but somewhat flexible coupling between the rotor and the stator allows for a misalignment between the center of rotation of the rotor and the bearing arrangement, and center of rotor of the stator. The bearing arrangement, to which the disc is secured, allows the center of rotation of the disc to be the same each time the cartridge is inserted into a drive. Thus, there is high repeatability and accuracy of alignment with successive insertions of the cartridge into the drive. Thus, runout and wobble due to misalinment of the disc with respect to the spindle motor is substantially eliminated.

In the present embodiment, the motor assembly and the stator assembly are configured in axial gap configurations.

Thus it is an object of the present invention to provide a removable cartridge with a disc mounted on a bearing arrangement contained in a cartridge.

It is also an object of the present invention to provide for a disc drive and a removable cartridge arrangement whereby the cartridge contains a rotor assembly and the disc drive contains a stator assembly of a spindle motor.

It is a further object of the present invention to provide for the rotor and stator assemblies to have axial gap type configurations.

It yet another object of the present invention to provide the rotor assembly located behind the cartridge housing so that no dust can be drawn in about the bearing arrangement as the disc revolves in the cartridge.

It yet another object of the present invention to provide for a cartridge which can be accurately and repeatedly engaged with a spindle motor of the disc motor so that runout and wobble are eliminated and so that the center of rotation of the disc with respect to the spindle motor is repeatedly the same.

It is yet a further object of the present invention to provide for a simplified receiver mechanism which does not require movement of the cartridge in a complex manner in order to accomplish the engagement of the cartridge with the spindle motor.

BRIEF DESCRIPTION OF THE FIGURES

FIG. 8 is a section view taken through line 8—8 of FIG. 7.

FIG. 9 is a section view taken through line 9—9 of FIG. 7.

FIG. 10 is still another embodiment of the drive and cartridge of the present invention shown in a view similar to the view of FIG. 8.

FIG. 11 is a top view with the top plate and certain elements removed of another embodiment of the drive of the present invention.

DETAILED DESCRIPTION OF THE PREFERRED EMBODIMENT

Figure 1:
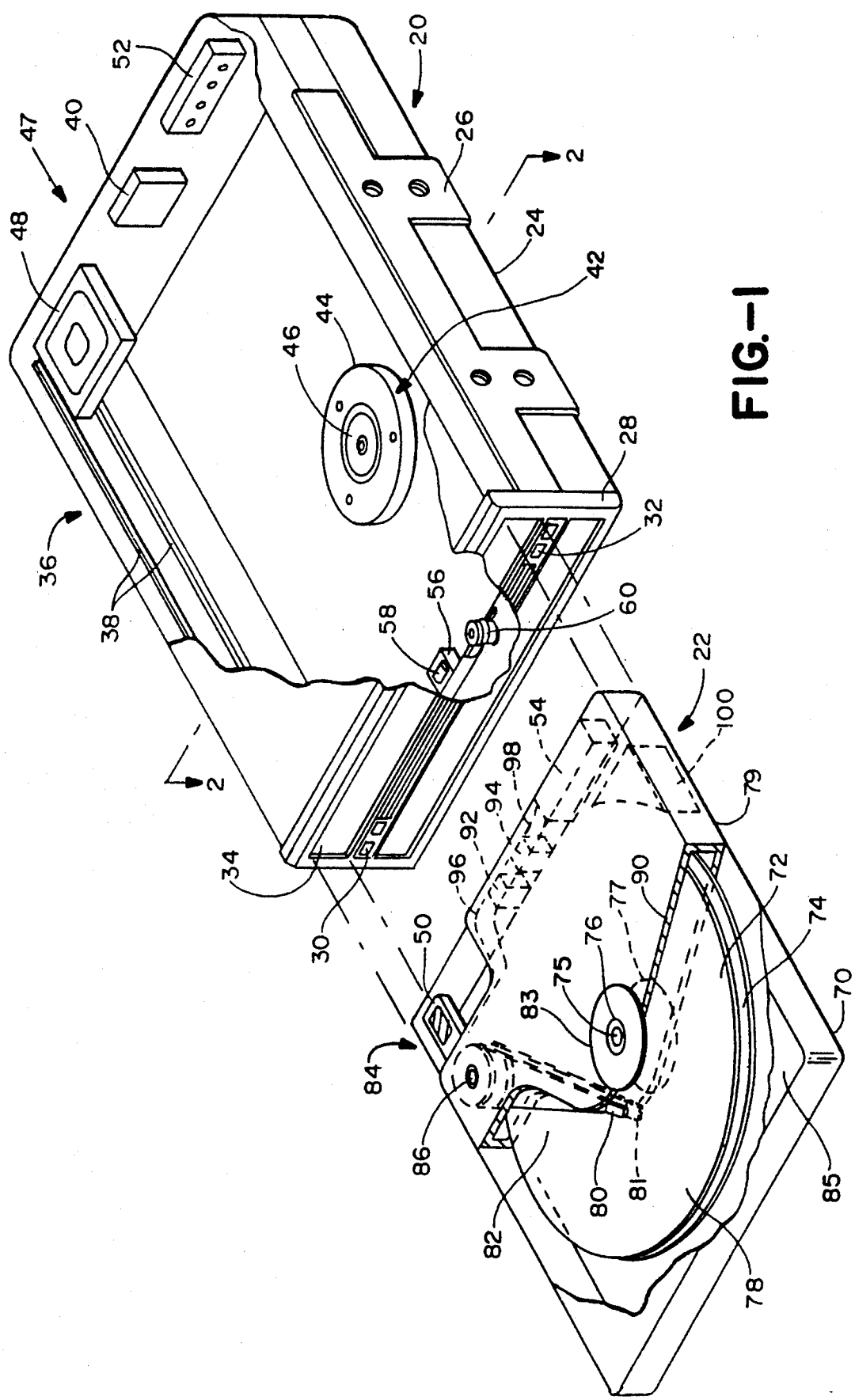
FIG. 1 depicts an embodiment of the disc drive of the invention which can accept an embodiment of a sealed cartridge of the invention and includes an actuator coil positioned in the drive.

With reference to the figures and in particular FIG. 1, a disc drive 20 and a sealed removable cartridge 22 of the invention are depicted. Disc drive 20 includes a housing 24 with side mounting brackets 26. Housing 24 further includes a faceplate 28. Faceplate 28 includes a cartridge ejection button 30 and a mode selection button 32. The faceplate 28 further includes a hinged door 34 which is urged out of the way by the sealed cartridge 22 as it is inserted into the disc drive 20.

A receiver mechanism 36 for the disc drive includes tracks 38 upon which the sealed cartridge 22 slides as it is inserted into the drive 20. These tracks 38 allow the cartridge 22 to be inserted in a straight-in manner. The receiver mechanism 36 includes a stop 40 which limits the rearward motion of cartridge 22 as it is inserted into the drive 20.

Figure 2:
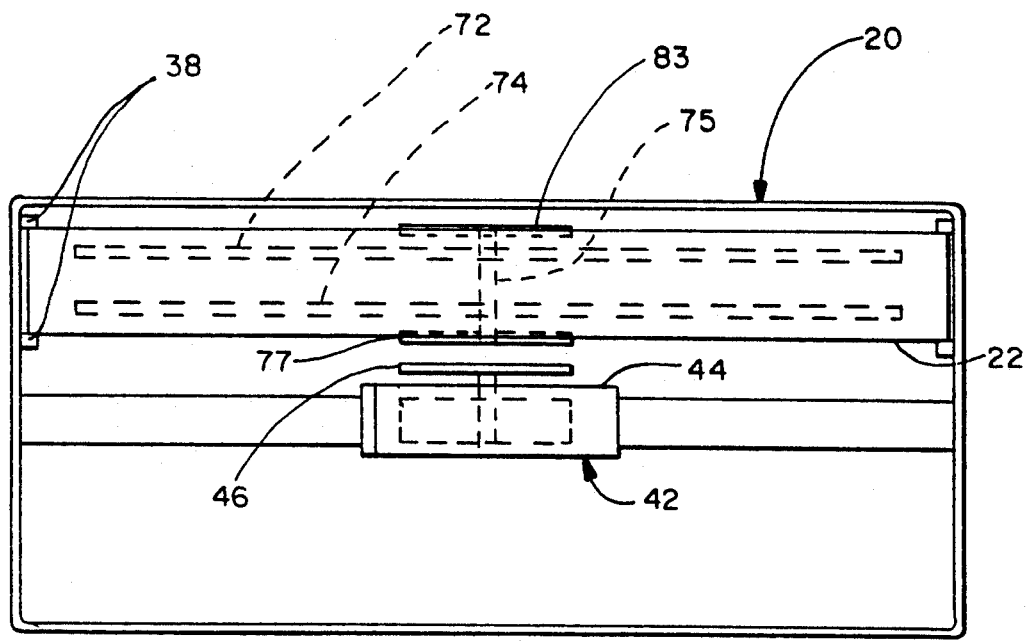
FIG. 2 depicts a sectional view taken through line 2—2 in FIG. 1 with a cartridge inserted into the drive.

The disc drive 20 further includes a spindle motor assembly 42 which is mounted to the housing 24. The spindle motor assembly 42 includes a motor 44 and a clutch plate 46 which is comprised in a preferred embodiment of eight alternating north and south poles. It is to be understood that there may be as few as only a single north and a single south pole in the clutch plate 46 as well as many more than the eight alternating north and south poles. As can be seen in FIG. 2, with the cartridge 22 inserted into the housing 24, cartridge 22 as will be described more fully hereinbelow, is spaced from the clutch plate 46 and the spindle motor assembly 42 so that there is no physical connection between the clutch plate 46 and the spindle motor assembly 42.

In FIG. 1 the disc drive 20 further includes an actuator 47 which in a preferred embodiment is comprised of a coil 48 such as used, in voice coil motor actuators for disc drives in general. This coil 48 is positioned in the disc drive 20 in such a way that it can be used, in conjunction with permanent magneto 50 in cartridge 22, to actuate the read/write heads positioned in the sealed cartridge 22 as will be explained hereinbelow.

Figure 3:
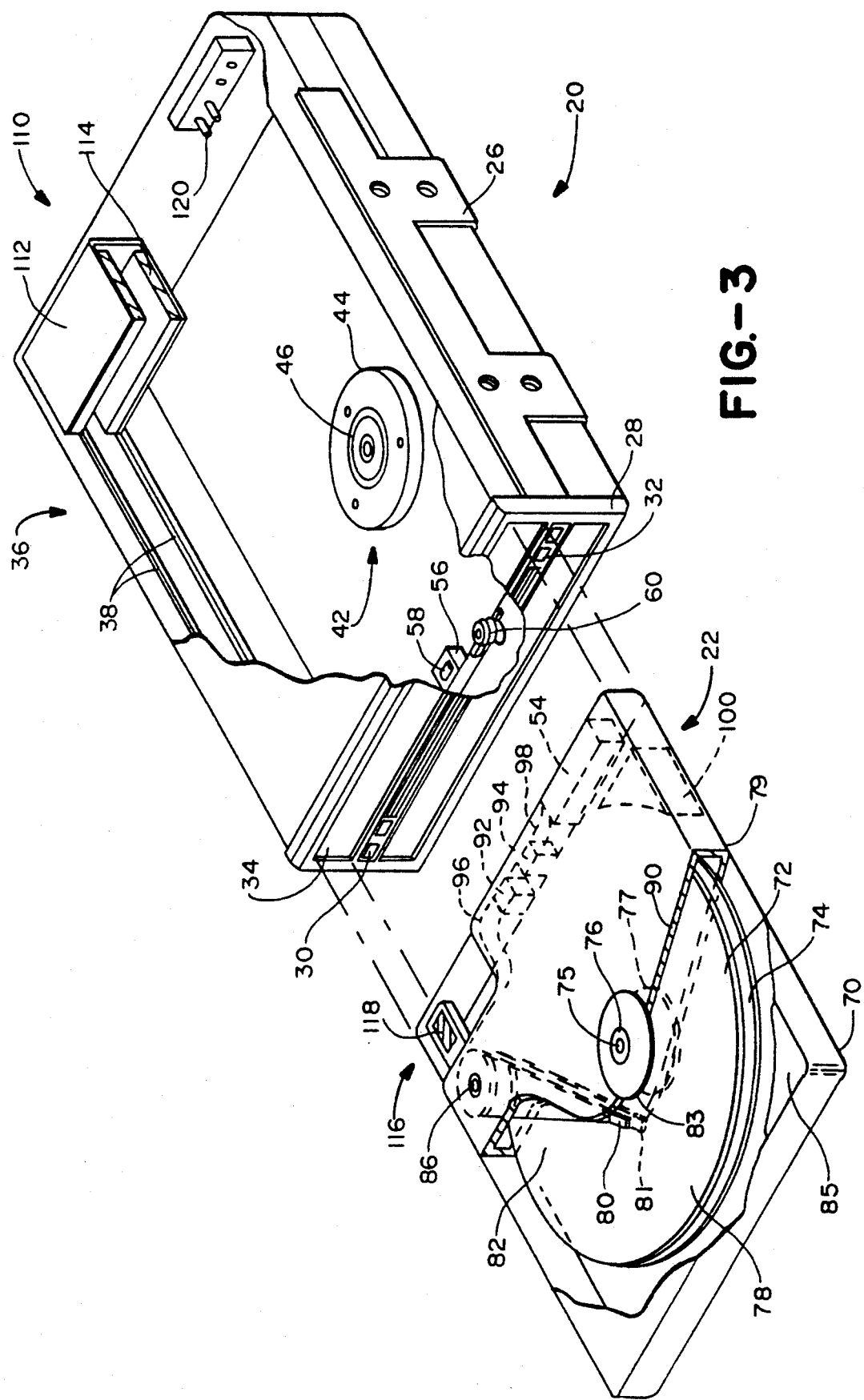
FIG. 3 depicts an embodiment of the invention similar to FIG. 1 but with an actuator permanent magnet located in the drive.

Further the disc drive 20 includes a data transfer connector 52 which is compatible with a connector of the cartridge 22 as will be explained hereinbelow. In a preferred embodiment this connector 52 includes an infrared sensor and an infrared source for allowing data to be transferred between the drive 20 and the cartridge 22 without physical contact between the connector 52 on the drive 20 and the connector 54 on the sealed cartridge 22. It is to be understood that the connectors 52, 54 can alternatively be comprised of transformers in order to transmit data to and from the sealed cartridge 22. Further, as an alternative embodiment the connector 52 can include contact points which are physically directly contacted with the contact points of the connector 54 on the cartridge 22. Still further a prong and receptacle arrangement such as shown in FIG. 3 can be used to transfer data. It is to be understood that if the cartridge 22 is not provided with battery power for operating the circuitry associated with the data communication, as explained below, that power can also be conducted through the connector 52 to the connector 54 by a direct contact mechanism or a plug to receptacle mechanism.

Disc drive 20 includes a cartridge loading and unloading motor 56 which powers a roller 58, which in a preferred embodiment can be comprised of rubber, in a clockwise direction in order to load the cartridge into the housing 24 and in a counterclockwise manner in order to unload the cartridge 22 from the housing 24. Cartridge loading motor 56 brings the cartridge 22 to rest against stop 40. Depressing button 30 causes motor 56 to eject cartridge 22 from disc drive 20.

The disc drive 20 further includes a cartridge locking plunger 60 which is shown in FIG. 1 in solid lines in an unlocked position and in phantom lines in a looked position. This cartridge locking plunger 60 causes a cartridge to be locked in to the housing 24 against the stop 40. Depressing button 30 also releases plunger 60 from the loaded position.

The cartridge 22 of the invention is also depicted in FIG. 1. Cartridge 22 includes a housing 70 which in a preferred embodiment is comprised of a rugged plastic material. Located inside of the cartridge 22 in a preferred embodiment are two data storage discs 72, 74. These discs 72, 74 are mounted for rotation about axis 75 on a hub assembly 76. Hub assembly 76 includes armature plates 77, 83 which are located externally to cartridge housing 70 adjacent lower side 79 and upper side 85 of the sealed cartridge 22. In a preferred embodiment plates 77, 83 are comprised of alternating north and south magnetic poles that can be engaged by the clutch plate as described below.

With each major surface such as major surface 78 of disc 72, a head, such as read/write head 80, is associated. Other heads 81 are shown in a phantom below head 80. Thus in a preferred embodiment having two discs, four read/write heads are associated, one each associated with each of the major surfaces of each disc. The heads 80, 81 are supported by a head arm assembly 82. The head arm assembly 82 is secured to an actuator assembly 84 which is provided for rotation about axis 86. The axis 86 of rotation for head arm assembly 82 is substantially parallel, in a preferred embodiment, to that of axis 75 of the hub assembly 76. Secured to the actuator assembly 84 is the abovementioned magnet 50. Thus movement of the magnet 50, which in a preferred embodiment is a permanent magnet, as caused by the coil 48 in the drive results in the movement of the read/write heads 80, 81 relative to the discs.

An internal housing 90, which in a preferred embodiment is comprised of steel, is located inside of the cartridge housing 70 and is used to mount the axis 75, 86 in order to provide the appropriate structural integrity for keeping these axis properly aligned.

Communicating with the read/write heads 80, 81 is an appropriate read/write circuitry 92 which is located inside the cartridge 20 and which is associated with an energy storage device such as the battery 94, which powers the read/write circuitry 92. A cable 96 provides communication between the heads 80, 81 and the read/write circuitry 92, while another cable 98 provides communication between the read/write circuitry 92 and the connector 54.

Also provided in the cartridge 22 is an air filter 100 which filters the gas which is provided in the cartridge 22.

In a preferred embodiment it is to be understood that an inert gas such as argon is used to fill the cartridge. This inert gas allows the heads 80, 81 to fly lower and closer to the discs and thus increases the capacity of the disc to store data. Further, as there is no atmosphere in cartridge 22, there is no condensation, and friction is reduced. After the gas is injected into the cartridge 22, cartridge 22 is hermetically sealed to all but eliminates contamination damage to the discs and heads.

In operation, the cartridge 22 is inserted into the door 34 of the disc drive 20 with the cartridge load motor 56 urging the cartridge into the disc drive 20 and against the stop 40.

With the cartridge 22 fully inserted into the drive 20 the armature plate 77, which is the circular magnetic plate located adjacent to the lower side 79 of the cartridge 22 comes into alignment with the magnetic clutch plate 46 of the spindle motor assembly 42. In a preferred embodiment, the eight north and south pole segments of the armature plate 77 engage with the eight north and south pole segments of the clutch plate 46 such that the turning of the clutch plate 46, as caused by the spindle motor 44, causes the armature plate 77 and thus the discs 72, 74 to spin at the proper rotational velocity.

The cartridge locking plunger 60 locks the cartridge in place with the permanent magnet 50 aligned underneath the coil 48 of the actuator 47. With power being applied to the coil 48, the magnet 50 is urged to move and properly position the heads relative to the disc. With the heads properly positioned, data can be transferred to or read from the discs by the use of the connectors 52, 54 which provide for the transfer of information from the cartridge to the disc drive.

An alternate embodiment of the invention is depicted in FIG. 3. In this embodiment, the actuator 110 associated with the drive 20 includes first and second magnets 112, 114 which in a preferred embodiment are permanent magnets. The cartridge 22 includes an actuator assembly 116 and a coil 118. Unlike the read/write circuitry 92, the coil 118 draws substantial power, requiring that power to be provided to the cartridge directly from drive 20 in order to operate the coil assembly 118. This being the case, a standard prong and receptacle arrangement is provided with prongs 120 extending from the data transfer connector 52 in the drive 20 for mating with the receptacles in the data transfer connector 52 in the drive 20 for mating with the receptacles in the data transfer connector 54 of the cartridge 22.

Figure 5:
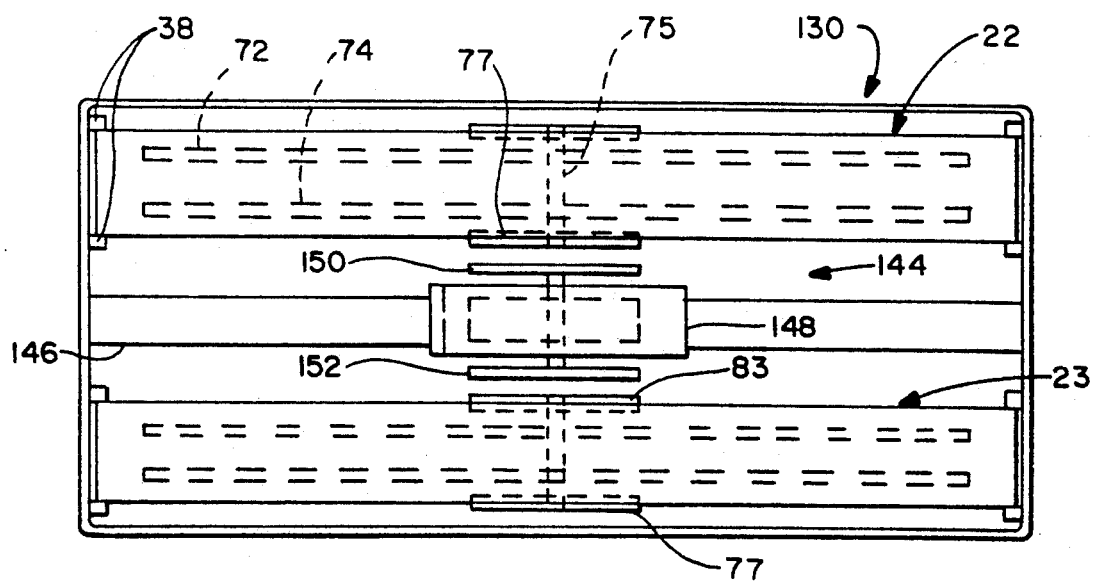
FIG. 5 depicts a sectional view of FIG. 4 through line 5—5 with two cartridges inserted into the disc drive.
Figure 4:
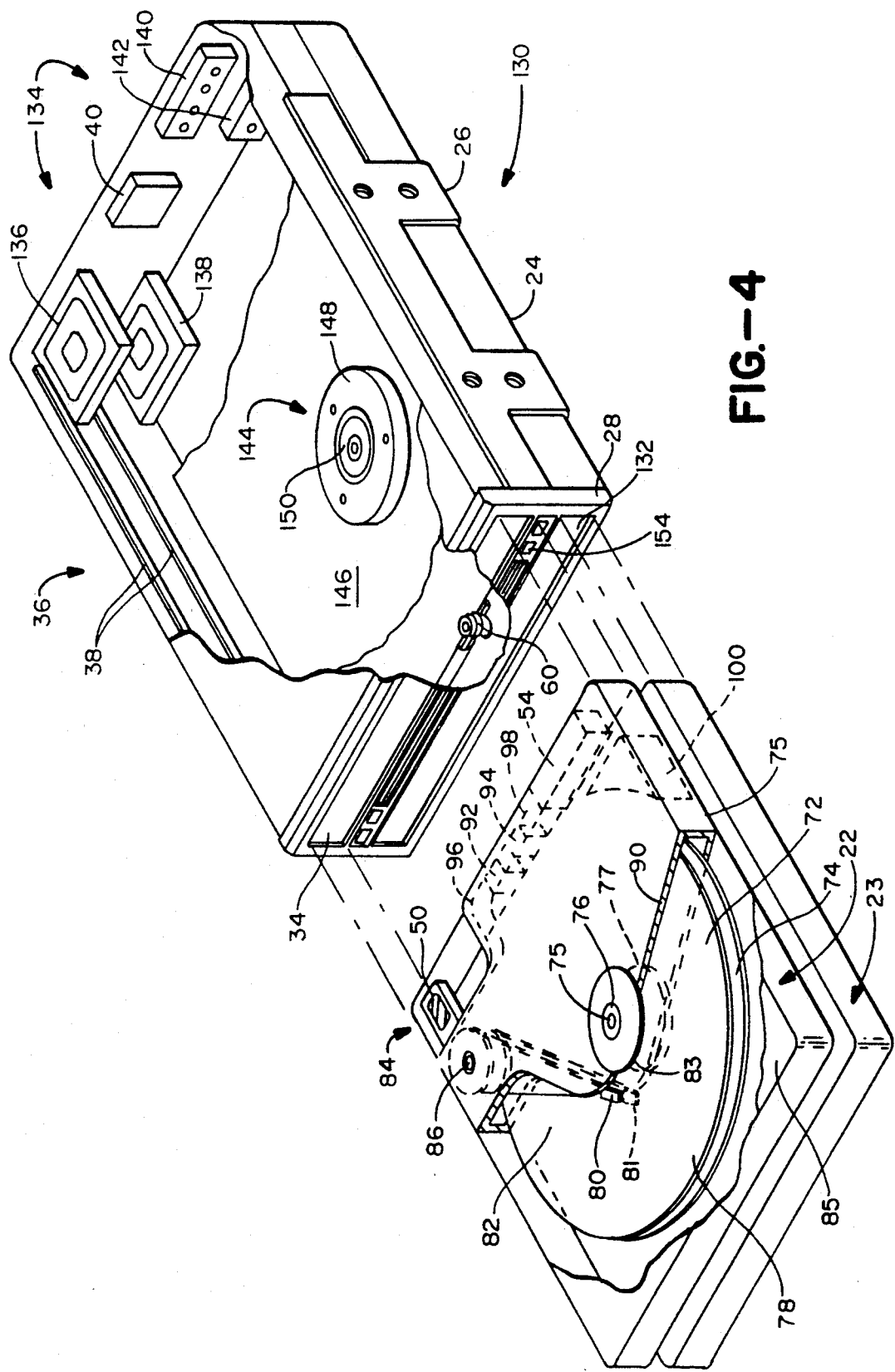
FIG. 4 depicts an embodiment of a disc drive of the invention which can receive two cartridges of the invention.

Another alternative embodiment 130 of the invention is shown in FIGS. 4 and 5. In disc drive 130, elements which are similar to those shown in the embodiments in FIGS. 1 through 3 are numbered identically. In FIG. 4 it can be seen that the disc drive 130 is provided for receiving two cartridges, cartridge 22 and cartridge 23. Cartridge 22 is inserted as described hereinabove. Cartridge 23 is inserted through a second door 132. It is to be understood that cartridge 22 and 23 are identical.

The drive 130 includes an actuator assembly 134 which has first and second coils 136, 138. Each coil is used to actuate the magnets associated with the heads into the cartridges 22, 23 in order to cause the heads to traverse the discs. Disc drive 130 includes first and second connectors 140, 142 for providing data transfer connections to the cartridges that are inserted in the drive as discussed hereinabove.

The spindle motor assembly 144 is mounted though a plate 146 which divides the drive 130 into two compartments, one compartment for each of the cartridges 22, 23. The spindle motor assembly 144 includes a spindle motor 148, upper and lower magnetic clutch plates 150, 152 similar in design and concept to the magnetic clutch plate 46 in FIG. 1. A cartridge 22 inserted through the upper door 34 would have an armature plate, such as armature plate 77 in alignment with the upper magnetic clutch plate 150, while the armature plate 83 of cartridge 23 would be in alignment with the lower magnetic clutch plate 152.

Drive 130 includes a mode selector switch 154 which allows the drive 130 to be placed in one of the several modes. The first mode allows a host computer to selectively place data on one or the other cartridges as directed by the host.

The second mode allows for automatic and instantaneous backup, in that data is recorded simultaneously on both the first cartridge as the primary cartridge and on the second cartridge as the backup cartridge.

Figure 6:
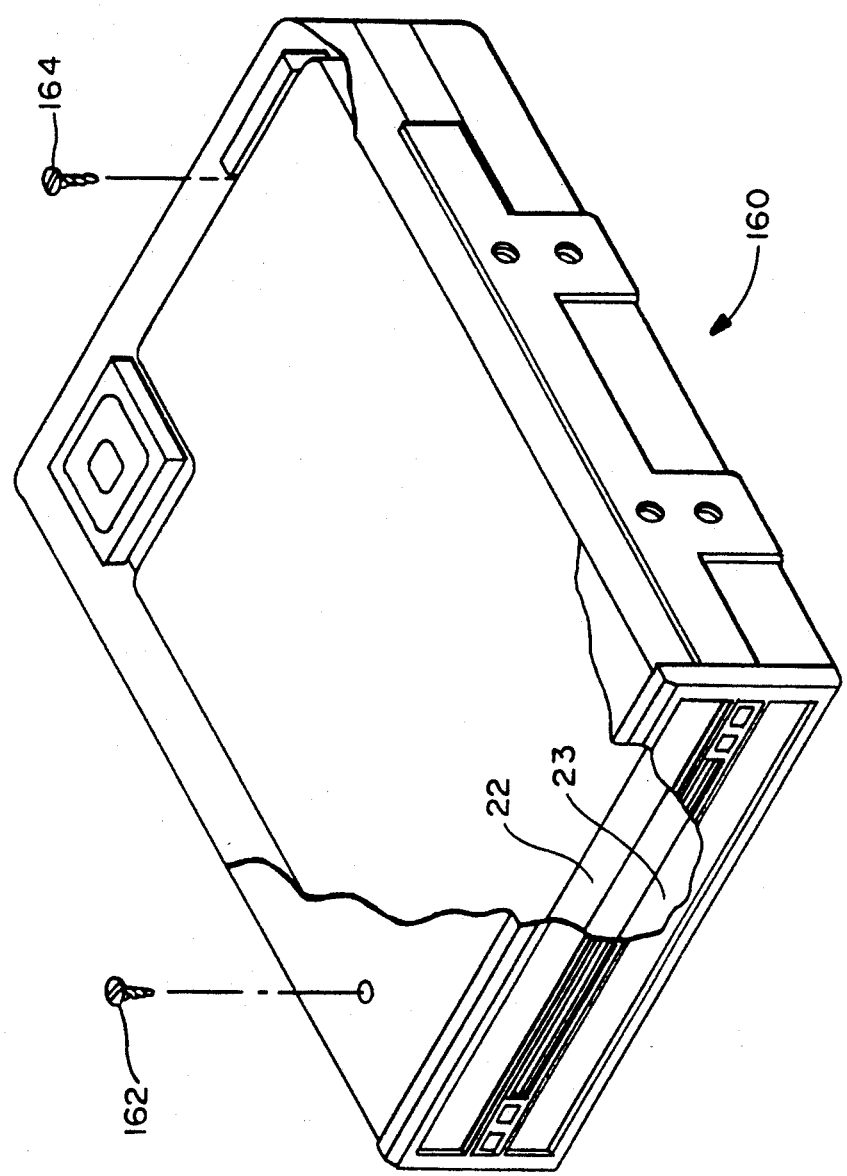
FIG. 6 depicts a disc drive which accepts two cartridges and which cartridges can be secured permanently in the drive to provide for a disc drive with fixed cartridges and thus fixed discs.

Another embodiment of the invention is shown in FIG. 6. In this embodiment cartridges 22 and 23 are permanently affixed into drive 160 by appropriate securing mechanisms such as screws 162, 164. Thus the disc drive of the invention can be converted into a fixed drive with the capacity of currently available fixed drives. It is to be understood that in a preferred embodiment, each disc in the cartridge contains approximately fifty to one hundred megabytes of information and thus each cartridge can contain approximately one hundred to two hundred megabytes of information. The two cartridges fixed into drive 160 giving this drive 160 the capability of storing up to 400 megabytes of data.

Figure 7:
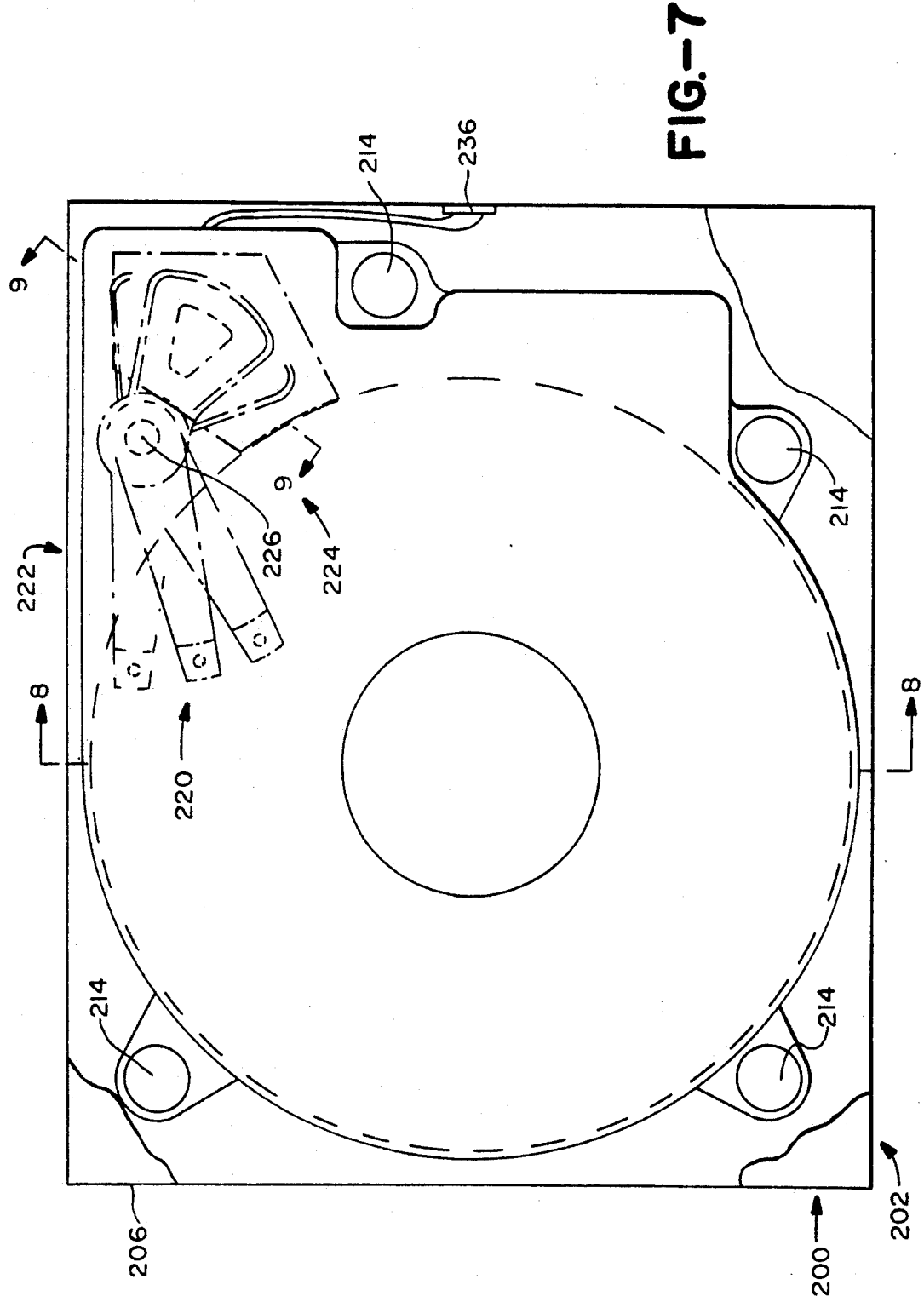
FIG. 7 is a top, partially cut away view of another embodiment of the cartridge invention.

Another embodiment 200 of the removable cartridge of the present invention is depicted in FIGS. 7, 8 and 9. This embodiment includes an outer housing 202 includes a top 206 and a base 208 and the inner housing 204 includes a top 210 and a base 212. In FIG. 7, the top 206 of the cartridge 200 has been partially cut away in order to reveal the positioning of the inner housing 204. The inner housing 204 is mounted to the base 208 of the outer housing 202 with shock mounts 214. In a preferred embodiment the shock mounts 214 can include, by way of example only, rubber mounts used to secure the inner housing 204 to the outer housing 202. The top 206 and the base 208 of the outer housing 202 are sealed together by methods known in the trade in order to prevent additional contaminants from reaching inside of the outer housing. Similarly, the top 210 and the base 212 of the inner housing 204 are sealed in order to prevent additional contaminants from reaching the inside of the inner housing.

The present embodiment has the advantage that should the cartridge 200 be dropped, the housing and the shock mounts insulate the discs 216, 218 from the shock of impact.

The four heads 220 mounted on the head arm assembly 222 are also insulated from shock by the shock mounts 214. The heads 220 and the head arm assembly 222 are shown in phantom in FIG. 7. Also shown in phantom in FIG. 7 is the actuator assembly 224. The head arm assembly 222 and the actuator assembly 224 pivot about axis 226 as is demonstrated by the three positions of the heads 220 shown in phantom in FIG. 7. As can be seen in FIG. 9, the actuator assembly 224 includes a voice coil type mechanism 228 which has upper and lower permanent magnets 230, 232 and an electromagnetic 234. The permanent magnets 230, 232 which are affixed to the top 210 and base 212 of the inner house 204, respectively. The electromagnet 234 is mounted on an extension of the head arm assembly 222 pivot about axis 226 such that as the current to the electromagnet 234 changes, the position of the electromagnet 234 and the position of the arm assembly 222 and heads 220 change in order to position the heads at a desired location relative to the tracks on the discs 216, 218. A connector 236 is provided for communicating data signals to and from the heads 220 and position signals to the actuator assembly 224. The connector 236 mates with a connector positioned in the drive as demonstrated by the other embodiments.

In viewing FIG. 10, an alternative embodiment 250 of the removable cartridge is depicted positioned in a drive 262. In this embodiment, each cartridge includes upper and low magnetic armature plates 252, 254. These armature plates 252, 254 extend from the outer housing 256 of the cartridge 250. In this arrangement, the cartridges 250 can be positioned in either the upper receiving mechanism 258 or the lower receiving mechanism 260 of the drive 262 without inverting the cartridge as in either receiving mechanism 258, 260, both the upper clutch plate 264 and the lower clutch plate 266 of the spindle motor 268 are magnetic and can engage either the upper armature plate 252 or the lower armature plate 254 which is placed adjacent thereto.

In this embodiment, the cartridge 250 includes shutter mechanisms such as shutter mechanism 270 which are used to cover both the upper and lower armature plate 252, 254. The shutter mechanism 270 is comprised of a material, known in the art, which can provide a magnetic field shield. The shutter mechanisms are spring loaded by spring mechanism 272. Just prior to the cartridge 250 being ejected from the drive, the drive releases the spring mechanism 272 so that the spring mechanism 272 can cause the shutter 270 to be positioned over the magnetic armature plates, 252, 254 in order to break the magnetic bond between the armature plates and the clutch plates. With the cartridge removed from the drive, the shutter prevents metallic objects from being attracted to the armature plates. When the cartridge is in position in the drive, the drive overrides the spring mechanism 272 to urge the shutter 270 away from its covering position exposing the magnetic field of the armature plate 254 to the magnetic field of the clutch plate 264 of the spindle motor 268. In FIG. 10, shutters 274, 276 have been urged into non-shielding positions.

FIG. 11 depicts yet an alternative embodiment 300 of the drive with a cartridge loading mechanism 302. This loading mechanism 302 includes an upper loading mechanism 304 and a lower loading mechanism 306. The upper loading mechanism 304 is used to urge the cartridge into and eject the cartridge out of the upper receiving mechanism while the lower loading mechanism 306 is used similarly in conjunction with the lower port. The upper loading mechanism 304 includes a motor 308 and a pulley arrangement 310 which links the motor to a spring loaded mounting frame 312, which mounts rollers 314, 316. Through the pulley 310, the motor 308 can drive the rollers 314, 316 in order to urge the cartridge into the housing and eject the cartridge from the housing. Associated with the frame is a microswitch 315. As the cartridge is urged into the housing and contacts with the rollers 314, 316, the spring loaded frame 312 is urged from its rest position triggering microswitch 315 which causes the motor 308 to turn on causing the rollers 314, 316 to urge the cartridge into the drive. An eject button on the face of the drive causes the motor to drive the rollers 314, 316 in the opposite direction ejecting the cartridge. The lower load mechanism 306 works in a similar manner.

From the description of the preferred embodiment and the operation of the invention it is readily apparent that the disc drive 20 of the present invention provides for a simple, efficient, and economical drive and hermetically sealed cartridge. The drive contains a spindle motor having a magnetic clutch plate for magnetically engaging the magnetic armature plate of the cartridge so that there is not contact between the cartridge and the spindle motor assembly. Thus, the receiver mechanism of the disc drive is not required to align the discs with the spindle motor using the expensive techniques of the prior art devices.

Further, the actuator is divided into components, one located in the drive and the other in the cartridge so that the cartridge can be completely sealed with the heads 80, 81 permanently located in the cartridge 22 and positioned with respect to the discs 72, 74. As the cartridge is truly sealed, unlike prior art devices which require shutter doors to allow access into the cartridge, cartridge contamination can all but be eliminated.

The present invention also provides for a data transfer connector which is an infrared signal sender and sensor so that the cartridge and the housing do not have to be connected.

Further, it is evident that the cartridge 22 is ruggedized so that it can withstand harsh treatment while being transported from device to device.

It can be appreciated that for the above embodiments of FIGS. 1 to 11 that the center of rotation of the disc is always fixed with respect to the bearing arrangement (1) to which the disc is secured for rotation in the cartridge housing and (2) to which the magnetic armature plates are secured to allow engagement with the magnetic clutch plates of the spindle motor. The coupling between the magnetic armature and magnetic clutch plate is sufficiently flexible to allow for some misalignment between the armature and the clutch plate. The center of rotation of the disc with respect to the bearing arrangement is fixed, thus eliminating wobble or runout concerns.

Figure 12:
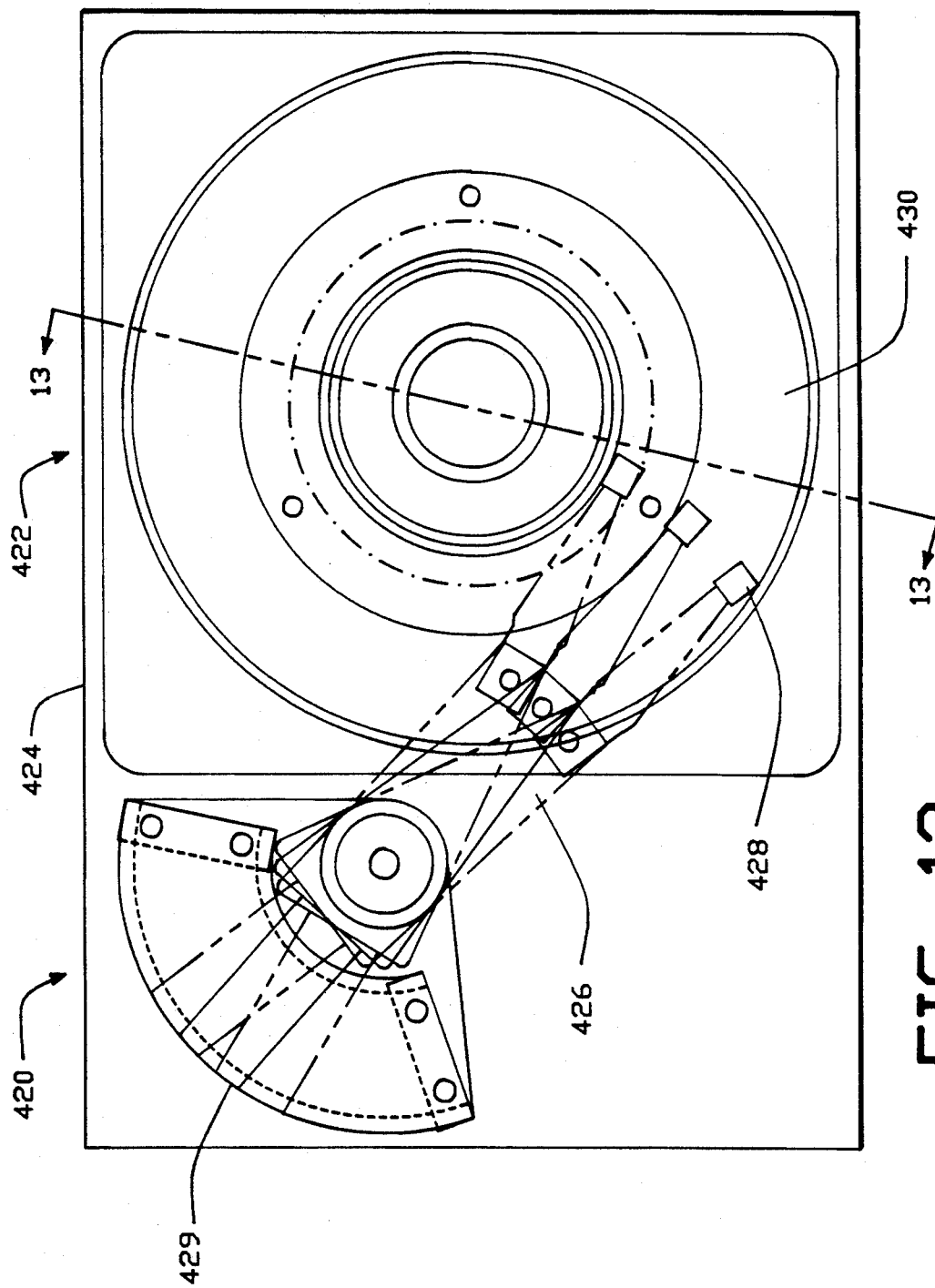
FIG. 12 depicts a plan view of an embodiment of a disc drive of the present invention with the cover of the housing of the disc drive and of the cartridge removed.

With reference to the figures and in particular FIG. 12, a drive 420 and a removable cartridge 422 of the invention are depicted. Drive 420 includes a housing 424 under which is pivotally mounted head arms 426 onto which are mounted the read/write heads 428. An actuator 429 causes the heads 428 to be pivoted into and out of engagement with the disc 430 mounted in the removable cartridge 422.

Figure 13:
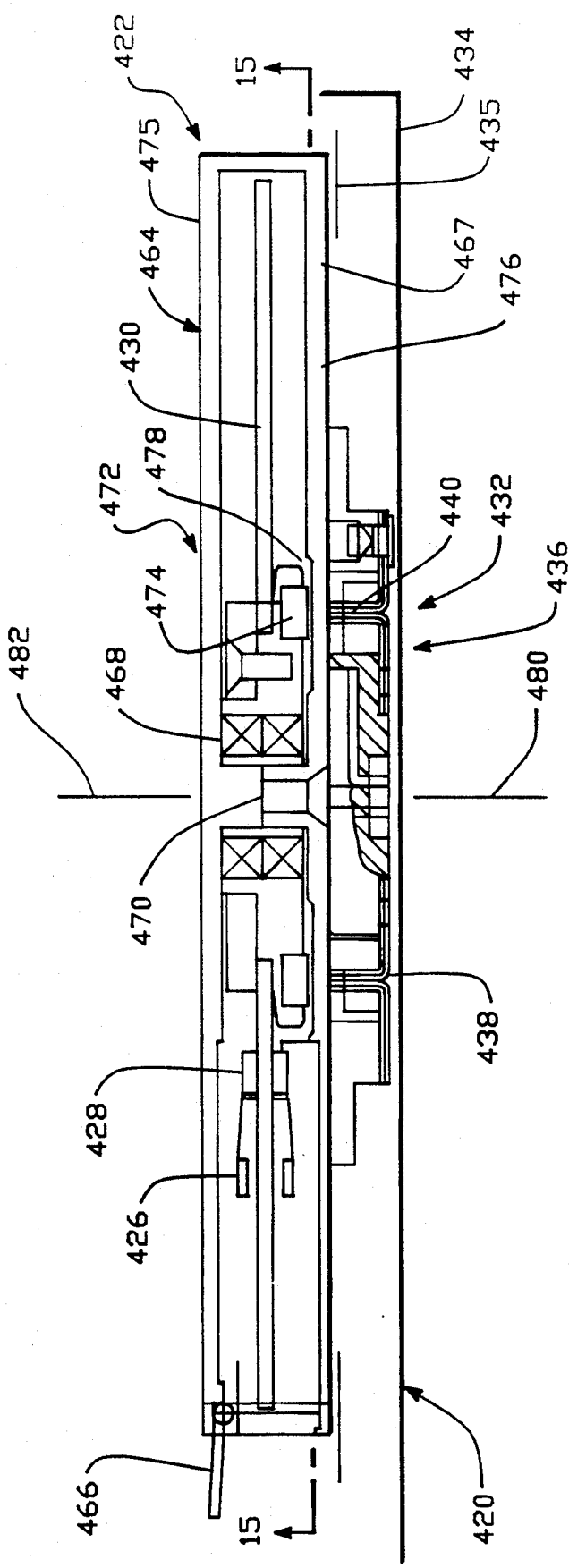
FIG. 13 depicts a cross-sectional view taken through line 13—13 of FIG. 12.
Figure 14:
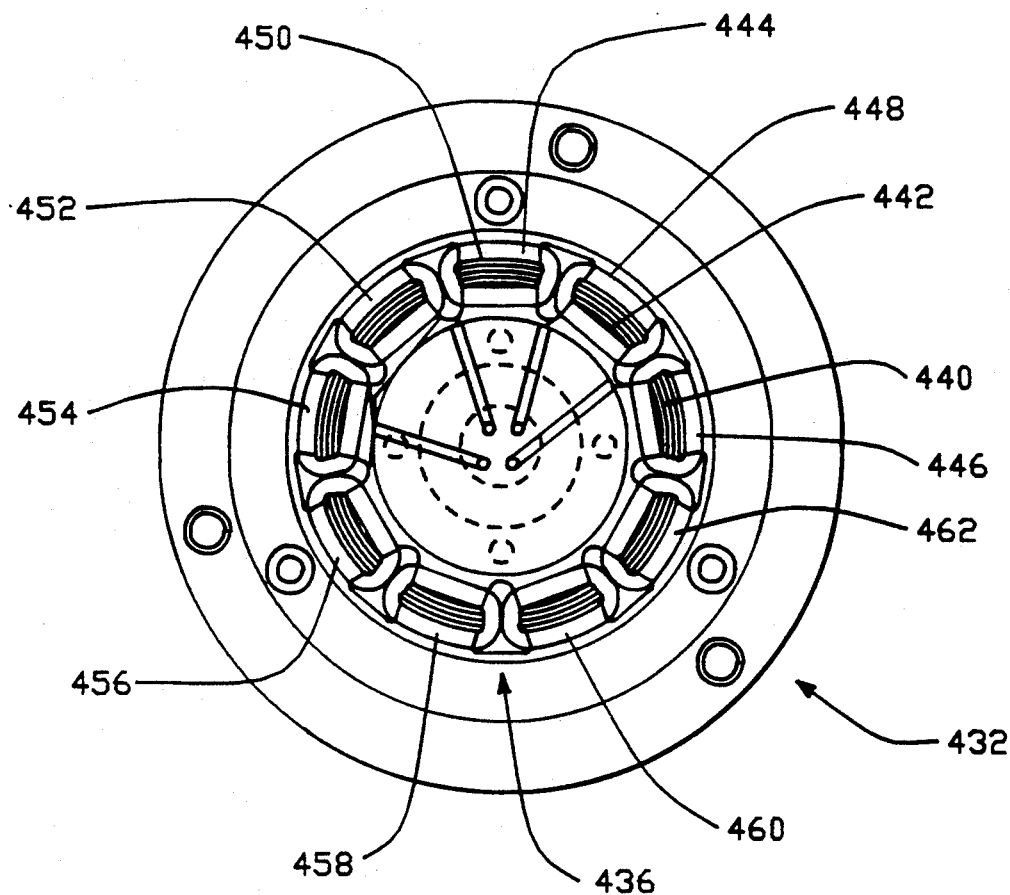
FIG. 14 depicts an enlarged view of an embodiment of the stator assembly of the spindle motor of the disc drive of FIG. 13.

In FIG. 13, a spindle motor 432 is depicted mounted on the base 434 of the disc drive 420. Spindle motor 432 is of an axial gap configuration. As can be seen in FIGS. 13 and 14, a preferred embodiment, the spindle motor 432 includes a stator assembly 436 which includes a motor lamination assembly 438 having upstanding members such as members 440, 442, 444. A plurality of phase coil windings are provided about the upstanding members. In a preferred embodiment, there are nine upstanding members and nine phase coil windings as can be seen in FIG. 14. It is to be understood that the lamination assembly 438 is comprised of a magnetically permeable material. In a preferred embodiment, coil winding 446, 452 and 458 are electrically communicated with each other. Similarly coil windings 448, 454 and 460 as well as coil windings 450, 456 and 462 are electrically communicated with each other in order to provide for a stator assembly 436 which has three phases.

As can be seen in FIG. 13, the removable cartridge 422 includes a housing 464, with a planar top 475 and a planar bottom 476, the top 465 of which was removed in FIG. 12 in order to show the inside details. A cartridge housing door 466 which allows the head arm assembly 426 and the read/write heads 428 to be pivoted into the cartridge 422 into contact with the disc 430. In drive 420, cartridge 422 is received by cartridge receiving mechanism 435.

The removable cartridge 422 includes a bearing arrangement 468 which is used to rotatably mount the disc 430 inside the cartridge housing 464. Screw 470 accomplishes the mounting of the bearing arrangement 468 in the cartridge housing 464. Mounted to the bearing arrangement 468 is a rotor assembly 472 which includes, in a preferred embodiment, a plurality of permanent magnets 474. As can be seen in FIG. 13 permanent magnets are disposed adjacent the planar bottom wall 476 of the cartridge housing 464. Also as can be appreciated, unlike prior art devices, there is no hub extending through the planar bottom wall 476. Thus, there is no possibility that dust can be drawn in between the bearing arrangement 468 and the walls of the cartridge when the disc is spinning at a high speed. Further, it can be appreciated that as there is no spindle extending up from the spindle motor, the cartridge 422 can slide directly into the disc drive 420 and into position immediately over the spindle motor 432 without any requirement of a linkage or other mechanism to allow the disc to first be positioned above the spindle motor and then be urged into an engagement with a spindle of the spindle motor.

As is evident from FIG. 13, an axial gap is defined between the rotor assembly 472 and the stator assembly 436. The planar bottom wall 476 of the removable cartridge 422 is disposed in this axial gap.

Figure 15:
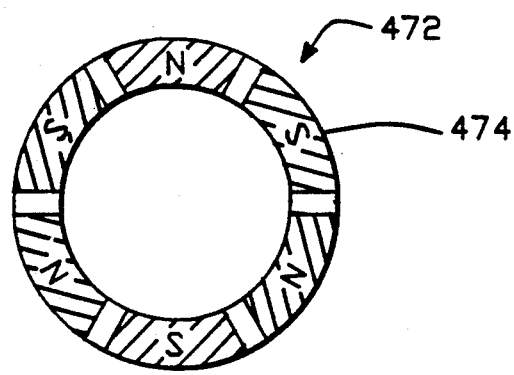
FIG. 15 depicts an enlarged view of the rotor assembly of the cartridge of the disc drive of FIG. 12.

FIG. 15 depicts a bottom view of the rotor assembly 472 showing the individual permanent magnets 474. As can be seen in FIG. 15, in a preferred embodiment, there are six permanent magnets which alternate between north and south poles. The six magnets are provided in a circular configuration.

In such an arrangement, it can be appreciated that the center of rotation 480 of the spindle motor of the disc drive need not be exactly aligned with the center of rotation 482 of the disc inside of the cartridge. The center of rotation 482 of the disc is however fixed with respect to the bearing arrangement 468 and the rotor assembly 472. Thus, this arrangement is accurately repeatable each time the cartridge is inserted into the drive. Thus, wobble and runout concerns of prior art devices are, for the most part, eliminated.

Figure 16:
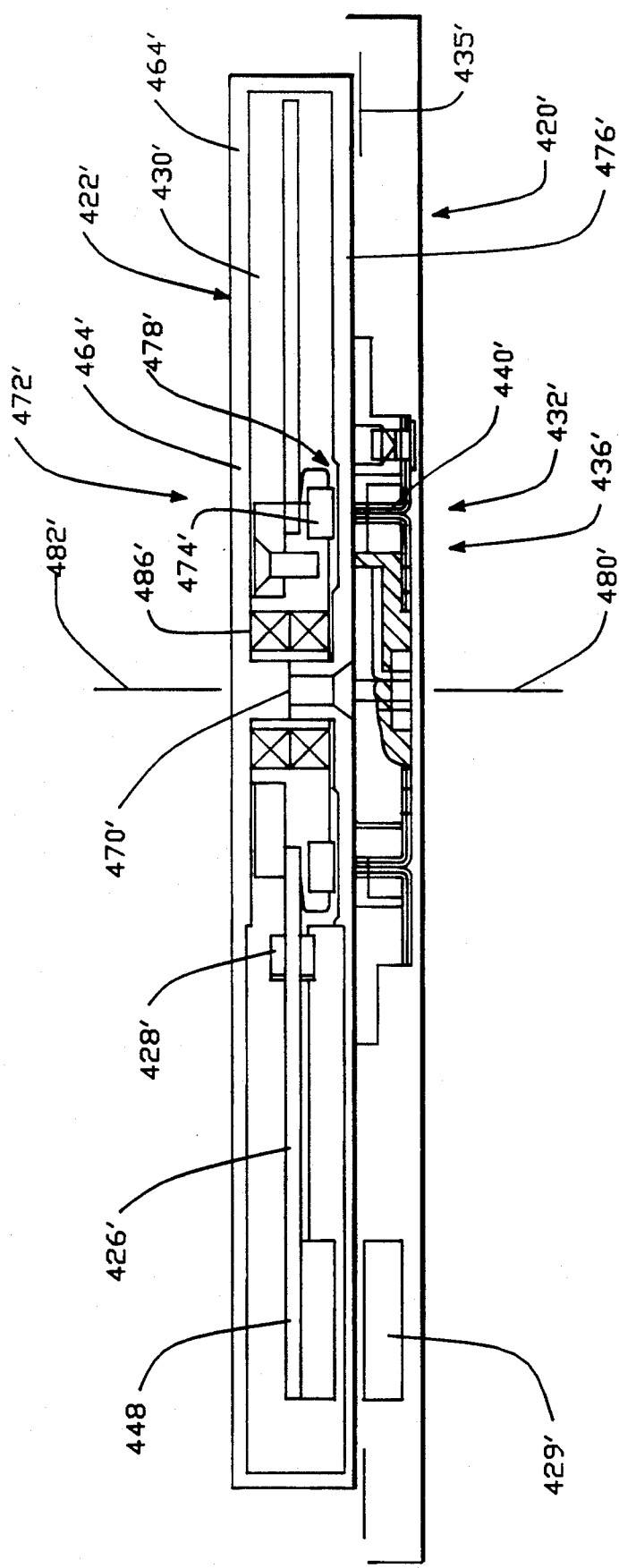
FIG. 16 depicts an alternative embodiment of the invention with the read/write head and a component of a head actuator permanently affixed inside the cartridge.

An alternative embodiment of the invention is depicted in FIG. 16. In this embodiment, the drive is denoted by 420' and the cartridge by 422'. Other elements have similar components in the embodiment of FIGS. 12 through FIG. 15 are similarly denoted with numbers which have been primed.

The embodiment of FIG. 16 includes an entirely sealed cartridge housing 464' which includes permanently pivotally mounted therein the head arm assemblies 246' and the read/write head 428' along with an actuator component 484 which is actuated by the actuator assembly 429' in order to position the heads 428' relative to the disc 430'. The present arrangement of FIG. 16 includes all the advantages of the arrangements of FIGS. 12 through 15 and in addition includes an entirely sealed cartridge due to the fact that the heads and the actuator component are sealed within the housing of the cartridge and thus as the disc 430' spins, no dust can be drawn into the cartridge 422'.

Figure 17:
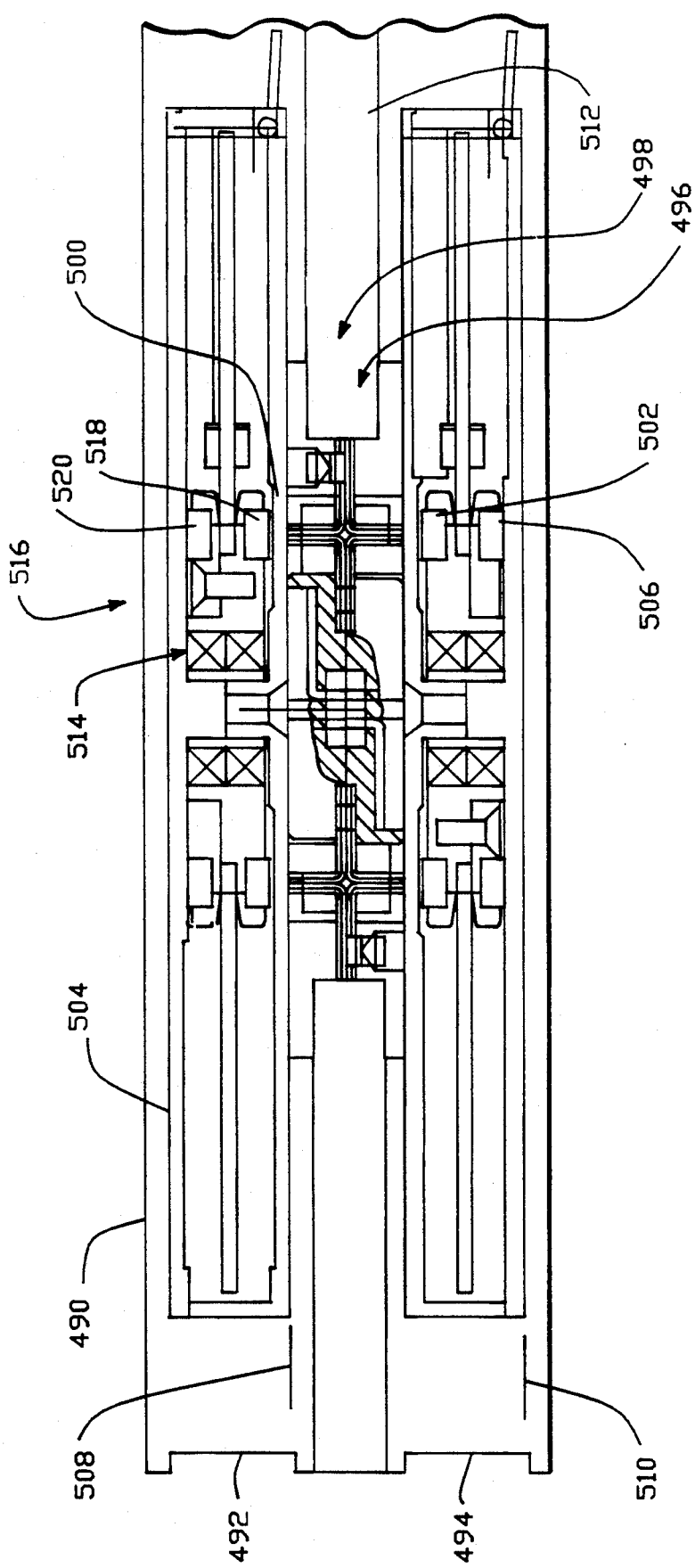
FIG. 17 depicts an alternative embodiment including a two port disc drive.

Yet another embodiment of the invention is shown in FIG. 17. The embodiment of FIG. 17 includes a disc drive 490 which has dual cartridge receiving ports 492, 494. Drive 490 includes a stator assembly 496 of a spindle motor 498 which in part defines two axial gaps 500, 502. In a preferred embodiment, the stator assembly 496 includes nine phase coil windings as does the stator assembly of the embodiment of FIGS. 12 through 16.

The removable cartridges 504 and 506 can be respectively positioned through the ports 492, 494 so as to rest on a cartridge receivers 508, 510.

The stator assembly 496 and the spindle motor 498 are mounted between the two cartridge receivers 508, 510 by a mounting structure 512.

As can be seen in FIG. 17, each of the cartridges such as cartridge 504 includes a bearing arrangement 514 which has a rotor assembly 516 which includes a first and second multiplicity of permanent magnets 518, 520. These magnets are arranged much as shown in the other embodiments of the invention.

From such an arrangement, it is evident that the cartridges 504, 506 can be positioned in either port 492 or port 494.

INDUSTRIAL APPLICABILITY

The operation of the present invention is as follows. Initially the removable cartridge 422 is inserted into a drive so that the stator assembly 436 of the spindle motor 432 is aligned with the rotor assembly 472 of the cartridge 422. The spindle motor 432 then causes the disc to come up to rotational speed and the heads are then disposed onto the disc so that normal read/write operations can occur. After the read/write operations are completed the above procedure is reversed in order to remove the disc from the cartridge.

From the above, it can be seen that the present invention provides for a disc drive and removable cartridge arrangement which eliminates wobble and runout problems, eliminates the dust problems, and provides for a highly repeatable system where the center of rotation of the disc is always positioned in the same manner with respect to the bearing arrangement and the rotor assembly. Further, the present invention does not require a complex cartridge receiver mechanism.

Other objects and aspects of the invention can be obtained from a review of the appended figures and claims.

It is to be understood that further embodiments of the present invention can be devised which come within the spirit and scope of the present invention as claimed.

We claim:

1. A disc drive adapted for receiving a sealed removable cartridge containing a disc mounted on a bearing arrangement having a rotor assembly containing a magnet, and a read/write head mounted in the removable cartridge adjacent to the disc with a first actuator component operably connected to the read/write head, wherein said disc drive comprises:

a housing including a cartridge receiving means adapted for receiving the cartridge;

a spindle motor means provided in said housing and including a stator assembly for operably engaging the rotor assembly of the removable cartridge for causing the disc to spin, said spindle motor means mounted in said housing such that with the cartridge received in said cartridge receiving means said stator assembly is spaced from, and operably engaging the rotor assembly of the cartridge;

wherein said stator assembly includes a plurality of electrical coils; and a second actuator component spaced from the first actuator component with the cartridge received in the cartridge receiving means and magnetically coupled to the first actuator component for causing movement of the first actuator component located in the cartridge without physically contacting the first actuator component in order to cause the read/write head to move relative to the disc.

2. The disc drive of claim 1 wherein said magnet of the rotor assembly includes a plurality of alternating magnetic poles.

3. The disc drive of claim 1 wherein there is an axial gap between the stator assembly and the rotor assembly with the sealed removable cartridge received in the cartridge receiving means.

4. A disc drive adapted for receiving a first sealed removable cartridge containing a first disc with the first disc mounted on a first bearing arrangement having a first rotor assembly containing a first magnet and the first sealed removable cartridge having a first head and a first actuator component connected to said first head, the first head mounted in the first removable cartridge adjacent to the first disc, and the disc drive adapted for also receiving a second sealed removable cartridge containing a second disc with the second disc mounted on a second bearing arrangement having a second rotor assembly containing a second magnet and the second sealed removable cartridge having a second head and a second actuator component connected to said second head, the second head mounted in the second removable cartridge adjacent the second disc, the disc drive comprising:

a housing including a cartridge receiving means adapted for receiving either or both of the first and second cartridges, said cartridge receiving means including a first receiver and a second receiver;

a spindle motor means including a stator assembly for operably engaging the first and second rotor assemblies when the first and second removable cartridges are received in the cartridge receiving means, for causing the first and second discs to spin;

wherein said stator assembly includes a plurality of electrical coils;

means for positioning said spindle motor means in said housing between the first and second receivers such that with at least one of the cartridges received in said cartridge receiving means, said spindle motor means is spaced from and operably engaged with said at least one of the cartridges; and a third actuator component spaced from the first and second actuator components with the first and second cartridges received in the disc drive and magnetically coupled to the first and second actuator components for causing movement of the first and second actuator components to cause movement of the first head relative to the first disc and the second head relative to the second disc without physically contacting either of the first and the second actuator components.

5. The disc drive of claim 4 wherein each of said first and second magnets includes a plurality of alternating magnetic poles.

6. The drive of claim 4 wherein there is an axial gap between the stator assembly and the first rotor assembly and wherein there is an axial gap between the stator assembly and the second rotor assembly with the first and second sealed removable cartridges received in the cartridge receiving means.

7. A disc drive and removable cartridge system comprising:
   a sealed removable cartridge containing a disc mounted on a bearing arrangement and having a rotor assembly containing a magnet, and a read/write head mounted in the removable cartridge adjacent to the disc, with a first actuator component operably connected to the read/write head; and
   a disc drive having:
   (a) a housing including a cartridge receiving means for receiving the sealed removable cartridge;
   (b) a spindle motor means provided in said housing and including a stator assembly for operably engaging the rotor assembly of the removable cartridge for causing the disc to spin, said spindle motor means mounted in said housing such that with the cartridge received in said cartridge receiving means said stator assembly is spaced from, and operably engaging, the rotor assembly in the cartridge;
   (c) wherein said stator assembly includes a plurality of electrical coils; and
   (d) a second actuator component spaced from the first actuator component with the cartridge received in the cartridge receiving means and magnetically coupled to the first actuator component for causing movement of the first actuator component located in the cartridge without physically contacting the first actuator component in order to cause the read/write head to move relative to the disc.

8. The disc drive of claim 7 wherein said magnet of the rotor assembly includes a plurality of alternating magnetic poles.

9. The disc drive of claim 7 wherein there is an axial gap between the stator assembly and the rotor assembly, with the sealed removable cartridge received in the cartridge receiving means.

10. A disc drive and removable cartridge system comprising:
    a first sealed removable cartridge containing a first disc mounted on a first bearing arrangement having a first rotor assembly containing a first magnet and a first read/write head mounted in the first sealed removable cartridge adjacent to the first disc with a first actuator component operably connected to the first read/write head;
    a second sealed removable cartridge containing a second disc mounted on a second bearing arrangement having a second rotor assembly containing a second magnet and a second read/write head mounted in the second sealed removable cartridge adjacent to the second disc with a second actuator component operably connected to the second read/write head;
    said disc drive having:
    (a) a housing including a cartridge receiving means for receiving the first and the second cartridges, said cartridge receiving means including a first receiver and a second receiver;
    (b) a spindle motor means provided in said housing and including a stator assembly for operably engaging the first and second rotor assemblies of the first and second sealed removable cartridges, with the first and second sealed removable cartridges received in the cartridge receiving means, for causing both the first and second discs to spin;
    (c) wherein said spindle motor means includes a plurality of electrical coils;
    (d) means for positioning said spindle motor means in said housing between the first and second receiver such that with at least one of the cartridges received in said cartridge receiving means, said spindle motor means is spaced from and operably engaged with said at least one of the cartridges;
    (e) a third actuator means component spaced from the first and second actuator components, with the first and second cartridges received in the cartridge receiving means, and magnetically coupled to the first and second actuator components for causing movement of the first and second actuator components located in the first and second cartridges in order to cause the first and second read/write heads respectively to move relative to the respective first and second discs without the third actuator component physically contacting either of the first and the second actuator components.

11. The system of claim 10 wherein:
    said first cartridge includes a housing having top and bottom substantially planar walls with the first disc contained therebetween;
    said first rotor assembly disposed adjacent the plane of one of said top and bottom planar walls of the first cartridge;
    said first cartridge including an additional rotor assembly forming part of said first bearing arrangement;
    said additional rotor assembly of said first cartridge disposed adjacent the plane of the other of said top and bottom planar walls of the first cartridge;
    said second cartridge includes a housing having top and bottom substantially planar walls with the second disc contained therebetween;
    said second rotor assembly disposed adjacent the plane of one of said top and bottom planar walls of the second cartridge;
    said second cartridge including additional rotor assembly forming part of said second bearing arrangement;
    said additional rotor assembly of said second cartridge disposed adjacent the plane of the other of said top and bottom planar walls of said second cartridge.

* * * * *